United States Patent

Wilson

[15] 3,661,326

[45] May 9, 1972

[54] INSECTICIDE AND REPELLANT HOLDER FOR ATTACHMENT TO GARBAGE CAN LID

[72] Inventor: Milton A. Wilson, 12265 S.W. Webster, Seattle, Wash. 98106

[22] Filed: Jan. 7, 1970

[21] Appl. No.: 1,129

[52] U.S. Cl. ................................239/60, 24/243 K, 43/120, 220/87

[51] Int. Cl. ..........................................................B05b 3/16

[58] Field of Search......................239/34, 36, 53, 55, 57, 60; 4/230; 21/74; 206/0.5; 223/86; 220/87, 94 R; 43/120; 24/243 K; 128/87, 169; 117/122; 224/45 Q; 16/110.5, 110 R; 211/105.1; 222/191; 248/65

[56] References Cited

UNITED STATES PATENTS

| | | | |
|---|---|---|---|
| 752,857 | 2/1904 | Paroubek | 206/47 X |
| 2,211,340 | 8/1940 | Mehrkens | 224/45 Q |
| 2,278,276 | 3/1942 | Maddox | 220/94 |
| 2,442,111 | 5/1946 | Beardsley | 117/122 |
| 2,613,991 | 10/1952 | Schindler | 239/60 |
| 2,721,098 | 10/1955 | Mangels | 239/57 X |
| 2,721,099 | 10/1955 | Rupp | 239/60 X |
| 2,847,106 | 8/1958 | Yawger et al. | 117/122 |
| 3,185,394 | 5/1965 | Farrell | 239/53 X |
| 3,408,077 | 10/1968 | Norwood | 128/87 X |

*Primary Examiner*—M. Henson Wood, Jr.
*Assistant Examiner*—Edwin D. Grant
*Attorney*—Fred C. Matheny

[57] ABSTRACT

A tube of suitable size to lie snugly within the concave upper part of the handle on a garbage can lid is adapted to receive a boat shaped receptacle containing insecticide or repellant, the vapor or odor of which will tend to drive insects and animals away from the garbage can and a pliable tape is secured to the tube and used to attach the tube to the handle on the lid of the can.

1 Claim, 5 Drawing Figures

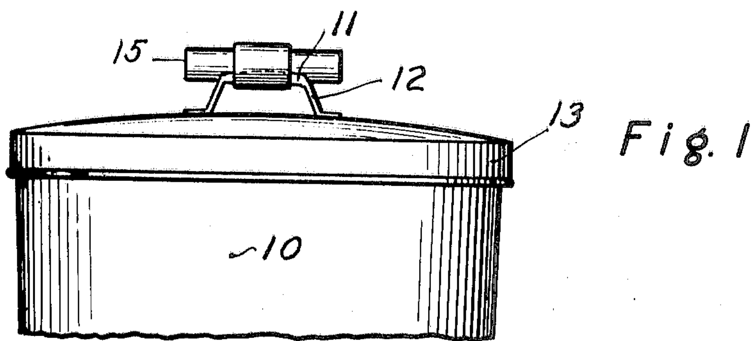
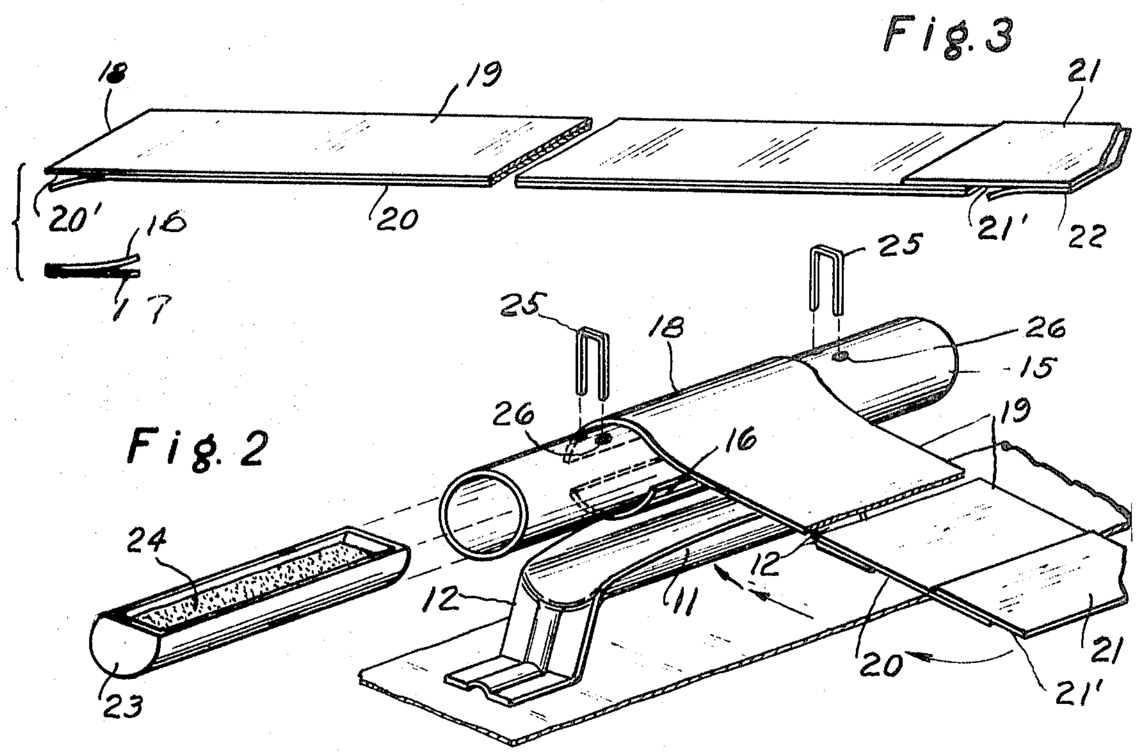
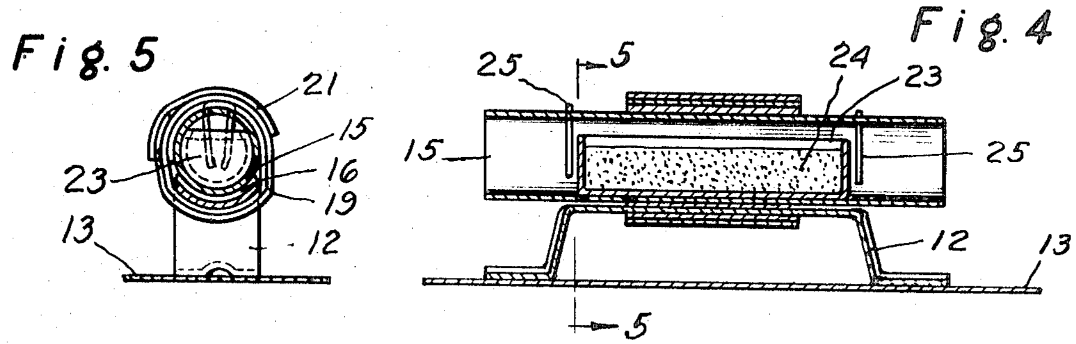
INVENTOR.
Milton A. Wilson
BY
Fred C. Matheny
ATTORNEY

INSECTICIDE AND REPELLANT HOLDER FOR ATTACHMENT TO GARBAGE CAN LID

BACKGROUND OF THE INVENTION

Garbage cans which are used out of doors cause much trouble and annoyance because the garbage in them tends to attract insects and animals. The insects, such as flies, are a nuisance and they tend to spread contamination from the garbage. Small animals, such as dogs and cats dislodge the can lids, making unpleasant noise and they are liable to pull garbage out of a can and scatter it and this intensifies the trouble and annoyance caused by the insects. Insecticides and repellants are available on the market which, if they can be properly used on or in connection with a garbage can, will give off vapors and odors not harmful to humans but which will tend to destroy or drive away insects, such as flies, or will give off disagreeable but not harmful odors which will prevent animals, particularly dogs, from molesting the garbage cans.

SUMMARY OF THE INVENTION

An object of my invention is to provide a simple and efficient holder which can be easily and securely attached to the handle of a garbage can lid and which will receive and hold an insecticide or repellant and protect the same from direct access by humans and animals and from the weather, while at the same time exposing the insecticide or repellant in such a manner that the air can pass over it to pick up and disseminate in the area close to the can, the vapors or odors repellant to the insects or animals.

Another object is to provide an insecticide and repellant holder which can be easily recharged with a fresh container of repellant or insecticide by a person familiar with the construction of said holder.

Another object is to provide a holder of this type which can be quickly and easily applied to the handle on a garbage can lid and which improves the handle by making it larger and easier and more convenient to grasp and the lid easier to handle.

Other objects of the invention will be apparent from the following description and accompanying drawings.

BRIEF DESCRIPTION OF THE DRAWINGS

FIG. 1 is a view in side elevation showing my insecticide and repellant holder attached to a handle on the lid of a garbage can.

FIG. 2 is an exploded perspective view, with parts broken away showing my insecticide and repellant holder in connection with the handle of a garbage can lid.

FIG. 3 is a detached perspective view, with parts broken away showing a tape used to attach my device to a handle on a garbage can lid.

FIG. 4 is a view in longitudinal section showing my holder attached to the handle on a garbage can lid.

FIG. 5 is an end view looking in the direction indicated by line 5—5 of FIG. 4, parts being shown in elevation.

Like reference numerals refer to like parts throughout the drawings.

DESCRIPTION OF THE PREFERRED EMBODIMENT

In the drawings 10 indicates a garbage can having on it a lid 13 provided with the usual centrally positioned U-shaped handle formed of a hand hold part 11 and legs 12. The legs 12 are permanently secured to the lid 13. The handle part 11 is of approximately semi-circular cross section and its concave side is uppermost thus forming a trough shaped groove which is open from end to end. Most of the handles on the lids of garbage cans of the out of doors type now in common use are of this shape and of uniform size and are well adapted to receive my holder.

This holder comprises a strong and durable tube 15, preferably about 1 inch in diameter and from 4 to 5 inches long. The tube 15 is of a size which adapts it to fit snugly within the concave upperpart 11 of the handle and when it is properly positioned in the handle part 11 it protrudes beyond the handle at both ends and cooperates in forming a better hand bold than is formed by the handle alone. The part of the tube 15 which is adapted to contact the handle part 11 when the tube is properly positioned in the groove in said handle part 11 is provided with adhesive coating 16 that is protected by a readily removable peel-off sheet 17 of pliable material.

The adhesive coating 16 is shown in FIG. 3, 2 and 5 with sheet 17 removed and both adhesive coating 16 and sheet 17 are shown in FIG. 3 with tube 15 omitted.

An inner end part 18 of a wrapping tape 19 is securely and permanently adhered or otherwise attached to the tube 15 about mid-way of the length of the tube and adjacent to the adhesive coating 16 on the tube. The inner side of the tape 19, outwardly from the end 18 thereof, has on it a coating of adhesive 20; FIG. 3, which is protected by a readily removable peel-off strip 20 of pliable material. The tape 19, when drawn out straight as shown in FIG. 2, is approximately at right angles to the tube 15. Preferably the tape 15 is about 2 inches wide and is long enough to make more than one complete wrap around the tube 15 and handle part 11 when the holder is secured to the handle as hereinafter explained.

A sealing strip or tab 21, which is permanently attached to and overhangs the outer end of the tap 19 has on the inner side of its overhanging part a strong adhesive 21 that is protected by a peel-off member 22. It will be apparent that the use of sealing tab 21 can be dispensed with if the inner side of the tape 19 is sufficiently adhesive so it will stay sealed and can not be easily pulled loose. However I find it desirable to use, for tape 19, a readily available less adhesive product and to seal the outer end of it with the more lightly adhesive tab 21.

A receptacle 23 containing a substance 24 capable, when exposed to air, of giving off vapors or odors which tends to drive away or destroy insects or which are repellant to dogs, cats and like animals out which is not injurious to humans is disposed within the tube 15. The receptacle 23 does not entirely fill the tube 15 but is considerably less than a full circle in cross section so it leaves enough space above it for a free circulation of air over the material 24 in it.

The receptacle 23 is secured in place within the tube 15, preferably by two staples 25 which extend transversely through holes 26 in at least one wall of the tube 15 and are positioned close to the respective ends of the receptacle 23. Preferably the holes 26 in the tube 15 are positioned so that when the staples are inserted they cannot drop out of the perforations or be easily removed but must be pulled with a tool to permit removal of the receptacle 23 and insertion of a new receptacle carrying fresh insecticide or repellant.

The holder forms a neat and compact package when it has a charged receptacle 23 in it and has the tape 19 loosely wound on it. When the holder is thus prepared for marketing the ends of the tube 15 are preferably closed by capping or plugging or covering them so as to exclude air from the insecticide or repellant. Said holder is quickly and easily applied to a handle part 11 by unwinding the tape 19, peeling coating 17 off of adhesive 16, pressing tube 15 firmly into handle part 11, peeling covering strip 20 off of tape 19, winding said tape 19 tightly around tube 15 and handle part 11, stripping off coating 22 from sealing tab 21 and pressing said tab 21 firmly into place.

I claim:

1. The combination with a handle on the lid of a garbage can, said handle having in it an outwardly facing trough shaped groove which is open and unobstructed at both ends, of a tube open and unobstructed at both ends and adapted to fit within the groove in said handle; adhesive tape means securing said tube to said handle; an insecticide and repellant container dimensioned to be inserted in said tube and leave an air circulation space between it and the inner walls of the tube, and vaporizable material in said container capable of giving off vapor to air passing lengthwise through said tube.

* * * * *